(12) United States Patent
Hung (10) Patent No.: US 9,108,259 B1
(45) Date of Patent: Aug. 18, 2015

(54) SCREW ROD FORMING MACHINE

(71) Applicant: DING SHEN MACHINERY CO., LTD., Taichung (TW)

(72) Inventor: Chi-Tien Hung, Taichung (TW)

(73) Assignee: DING SHEN MACHINERY CO., LTD., Taichung (TW)

( * ) Notice: Subject to any disclaimer, the term of this patent is extended or adjusted under 35 U.S.C. 154(b) by 0 days.

(21) Appl. No.: 14/313,898

(22) Filed: Jun. 24, 2014

(51) Int. Cl.
  *B23G 1/00* (2006.01)
  *B23G 1/08* (2006.01)
  *B23G 1/50* (2006.01)
  *B23G 1/02* (2006.01)

(52) U.S. Cl.
  CPC ... *B23G 1/08* (2013.01); *B23G 1/50* (2013.01)

(58) Field of Classification Search
  CPC ............ B23G 1/22; B23G 1/225; B23G 1/00; B23G 1/02; B23G 1/04; B23G 1/44; B23G 1/50
  USPC ........................................................... 82/113
  See application file for complete search history.

(56) References Cited

U.S. PATENT DOCUMENTS

| 2,551,517 A * | 5/1951 | Webb ................................ 408/8 |
| 3,834,255 A * | 9/1974 | Mulot .............................. 82/110 |
| 4,122,572 A * | 10/1978 | Pauls ............................. 470/176 |
| 4,225,273 A * | 9/1980 | Womack .......................... 408/12 |
| 6,290,089 B1 * | 9/2001 | Sampson et al. ............... 220/629 |
| 2003/0154831 A1* | 8/2003 | Nowak et al. .................... 82/129 |
| 2006/0243018 A1* | 11/2006 | Krauss .......................... 72/370.1 |
| 2007/0124904 A1* | 6/2007 | Muscarella et al. .......... 29/27 C |
| 2013/0055862 A1* | 3/2013 | Kundracik et al. ............. 82/113 |

FOREIGN PATENT DOCUMENTS

| CN | 203282175 U | 11/2013 |
| JP | 3185622 U | 7/2013 |
| TW | M408429 U | 8/2011 |
| TW | M462634 U | 10/2013 |

* cited by examiner

*Primary Examiner* — Will Fridie, Jr.
(74) *Attorney, Agent, or Firm* — Chun-Ming Shih (57) ABSTRACT

A screw rod forming machine includes a base unit, a straight moving unit, a lateral moving unit, a spindle unit, a platform, a clip unit, a lifting/lowering unit, a second processing unit, and a front/back moving unit. The second processing unit includes a power unit and a second processing knife tool moving in an up/down direction by the lifting/lowering unit. The front/back moving unit is disposed between the straight moving unit and the lifting/lowering unit, and includes a first sliding engagement part disposed on the straight moving unit, a second sliding engagement part disposed on the lifting/lowering unit, and a first power unit. The first and the second sliding engagement parts are slidably engaged with each other. The lifting/lowering unit moves along the first sliding engagement part by the first power unit.

14 Claims, 13 Drawing Sheets

SCREW ROD FORMING MACHINE

BACKGROUND

1. Technical Field

The present invention relates to a screw rod forming machine which not only forms the screw thread of the screw rod and trims the rough edge of the screw thread, but also forms grooves and key slots on the screw rod.

2. Related Art

The conventional rolling machine is a single process machine, which can only forms the screw threads on the screw rod. Therefore, after the screw threads have been formed on the screw rod, the screw rod with screw threads has to be taken off from the rolling machine to be further chamfered by a machine doing the trimming process, and the machining process of the screw rod with screw threads will finally be done.

Since the conventional machining process of producing the screw rod with screw threads is complicated and relies on human labor, which increases the cost and has the drawback of low yield, the applicant of the present invention applied a new design patent "screw rod forming machine" for Taiwan with application number M408429, which improves and solves problems of the conventional screw rod machining process. The screw rod forming machine includes a base unit, a straight moving unit, a lateral moving unit, a spindle unit, a platform, a clip unit, a lifting/lowering unit, and a second processing unit. After an unprocessed material forms a screw thread by a screw thread processing knife tool on the spindle unit, a second processing unit is used to smoothen the rough edge of the screw thread. By the automatic machining operated by the computer, the advantages of quick manufacturing and human labor saving can be achieved.

The aforementioned screw rod forming machine overcomes the problem of trimming rough edge of the screw thread by human labor. However, since the lead angle chamfering tool of the second processing unit used for trimming the rough edge of the screw thread is a tooth discoid shaped tool which is hung on one side of the screw rod forming machine, it is very easy for the user to touch the blade of the tool when operating the tool, and thus impedes working. Besides, the tooth discoid shaped tool is only limited to chamfer the lead angle, and no other works the tooth discoid can do.

Figure 18:
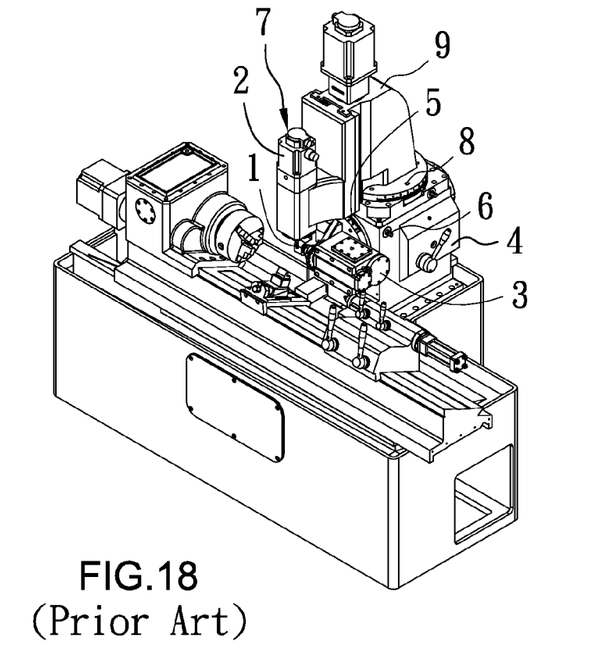
FIG. 18 is a schematic view of the conventional screw rod forming machine.

Therefore, the applicant of the present invention also applied a new design patent "screw rod forming machine" for Taiwan with patent application number M462634 (related application: Japan new design patent application No. 2013-003373; China new design patent application No. 201320312842.1) to solve the aforementioned problem. As shown in FIG. 18, the second processing knife tool 1 is hidden under the vertical power unit 2 in a vertical direction. By this arrangement, the worker cannot easily touch the second processing knife tool 1 when offloading the unprocessed material on the platform, thereby overcoming the problem caused in the previous model of the screw rod forming machine.

After practical operating, it has been found that the new design patent M462634 has the following drawbacks: when processing all sizes of unprocessed materials, the spindle unit 3 and the second processing unit 7 are disposed on the straight moving unit 4 in a relatively fixed position. Even if both of the spindle unit 3 and the second processing unit 7 can move in a front/back direction by the straight moving unit 4, the spindle unit 3 and the second processing unit 7 should move simultaneously, which leads to unable to do relative front/back movement. Thus, when the sizes of the unprocessed materials become bigger, the power unit 2 can no longer do the machining works on the center of the unprocessed materials. The bigger sizes the unprocessed materials are, the more serious the deviation can be. And also, since the second processing unit 7 is fixed relative to the spindle unit 3, the second processing unit 7 cannot do the front/back processing to the unprocessed material.

Figure 19:
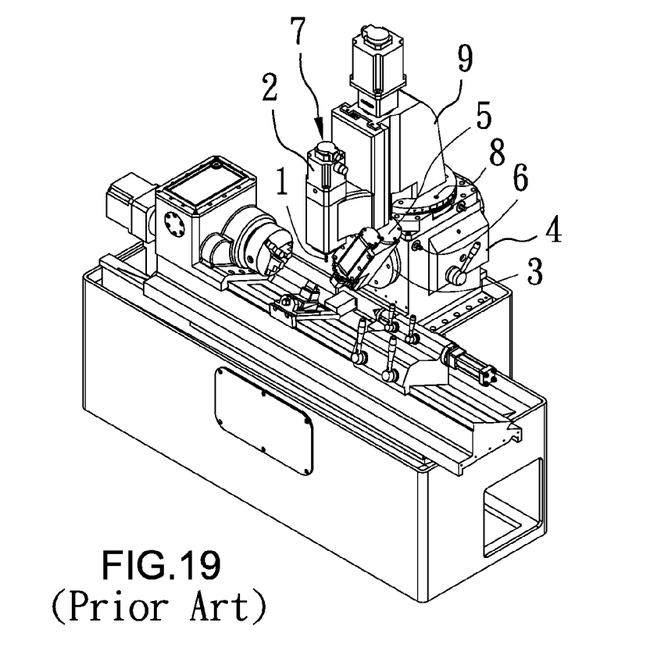
FIG. 19 is another schematic view of the conventional screw rod forming machine, which shows the second processing unit interfering turning of the spindle unit.
Figure 20:
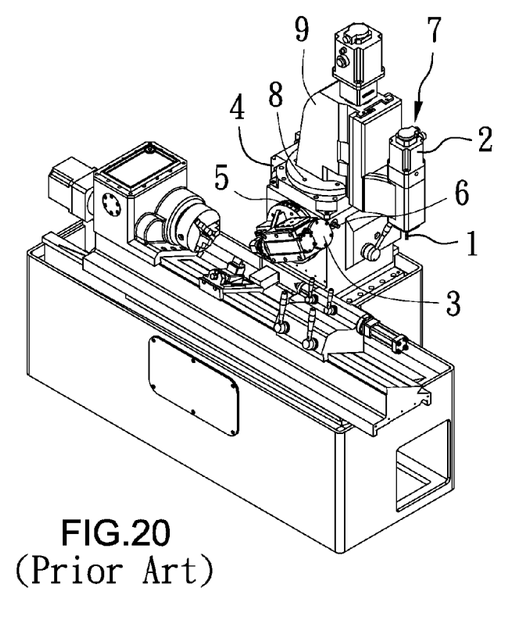
FIG. 20 is still another schematic view of the conventional screw rod forming machine, which shows turning the lifting/lowering unit to a side to be away from the spindle unit.
Figure 21:
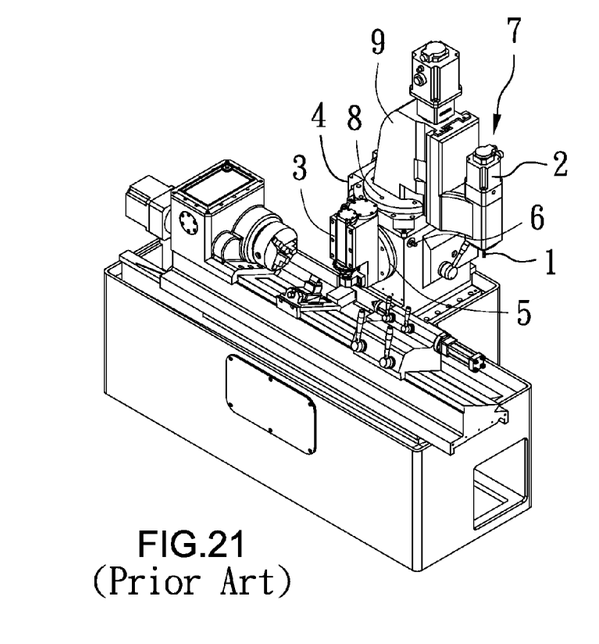
FIG. 21 is still another schematic view of the conventional screw rod forming machine, which shows the spindle unit turning to an upright position.

Moreover, as shown in FIG. 20, the spindle unit 3 can be adjusted to an upright position shown in FIG. 21 by an indexing plate 5 to do lateral processing. However, directly operating the lever (not shown in the figures.) of the axis 6 to rotate the spindle unit 3 can be impeded by being blocked by the second processing unit 7 (as shown in FIG. 19). The conventional way, as shown in FIG. 20, is to release all the bolts 8 of the lifting/lowering unit 9 to turn the lifting/lowering unit 9 to another direction, and also turns the second processing unit 7 to face to a side. After that, the spindle unit 3 can be turned to the upright position as shown in FIG. 21. Therefore, in order to turn the direction of the spindle unit 3, complicated steps such as releasing or tightening the bolts 8, turning the direction of the second processing unit 7, etc., are necessary, which can be very inconvenient and time consuming, and should be operated by human being, and is unable to be done automatically.

BRIEF SUMMARY

In order to solve the problems that the conventional screw thread processing machine cannot resolve, such as unable to do the front/back processing, releasing or tightening bolts to turn the spindle unit, and the lifting/lowering unit being unable to move in a front/back direction, a new screw rod forming machine is provided.

A screw rod forming machine based on the present invention is used to do the machining process to an unprocessed material. The screw forming machine includes a base unit, a straight moving unit, a lateral moving unit, a spindle unit, a platform, a clip unit, a lifting/lowering unit, a second processing unit, and a front/back moving unit. The platform is slidably disposed on the base unit by the lateral moving unit and is driven by the lateral moving unit to move toward right or left direction along the base unit. The spindle unit is slidably disposed on the base by the straight moving unit. The spindle unit is used to form screw threads on a screw rod, and the spindle unit includes a spindle motor and a spindle knife seat driven by the spindle motor. The thread forming tool is formed on the spindle knife seat. The spindle unit is driven by the straight moving unit to move toward front or back direction to be close to or away from the platform. The clip unit is disposed on the platform, and the clip unit includes a clamping head, a tailstock, and a clamping head rotation power device. The unprocessed material is clamped between the clamping head and the tailstock, and the unprocessed material is driven by the clamping head rotation power device to move. The lifting/lowering unit is provided on the straight moving unit. The second processing unit includes a power unit vertically disposed on the lifting/lowering unit, and a second processing knife tool is driven by the power unit. The second processing unit is able to be close to or away from the unprocessed material by moving up and down via the lifting/lowering unit. The front/back moving unit is disposed between the straight moving unit and the lifting/lowering unit. The front/back moving unit includes a first sliding engagement part disposed on the straight moving unit, and a second sliding engagement part disposed on the lifting/lowering unit, and a first power unit. The first sliding engagement part and the second sliding engagement part slidably connect to each other. The lifting/lowering unit is able to move toward front or back direction along the first sliding engagement part by being driven by the first power unit.

The aforementioned screw forming machine, wherein the first sliding engagement part has a notch; the first power unit of the front/back moving unit is accommodated inside the notch of the first sliding engagement part; the front/back moving unit further has a motor, a screw rod driven by a mandrel of the motor, and two bearing seats sleeved on both ends of a screw rod and a sliadable base sleeved on the screw rod; a bottom of the lifting/lowering unit is fixed to the slidable base; when the motor drives the screw rod to rotate, the slidable base and the lifting/lowering unit move along the screw rod simultaneously, thereby allowing the lifting/lowering unit to move toward the front/back direction on the straight moving unit and being relative thereto.

The aforementioned screw rod forming machine, wherein the first sliding engagement part is a groove track, and the second sliding engagement part is a sliding block; the first sliding engagement part and the second sliding engagement part are fitted to each other in a dovetail shape.

The aforementioned screw rod forming machine, wherein the second processing unit and the spindle unit move in a straight front/back direction by the front/back moving unit.

The aforementioned screw rod forming machine, wherein the motor is a servo motor with electromagnetic brake.

The aforementioned screw rod forming machine, wherein the spindle unit further comprises an indexing plate and a servo motor disposed on the straight moving unit; the servo motor drives the indexing plate and the spindle unit to rotate.

The aforementioned screw rod forming machine, wherein the straight moving unit further has a platen fixed to the second sliding engagement part for adjusting the tightness between the first and the second sliding engagement part.

Based on the above, the screw rod forming machine not only can automatically forms the screw threads on the screw rod and trims the rough edge of the screw threads by controlling by a computer, but also can process the unprocessed materials in the left/right or front/back direction, and the groove and key slot can be created as well. The front/back moving unit can move the lifting/lowering unit in a front/back direction relative to the spindle unit. Therefore, when the size of the unprocessed material becomes bigger, the second processing knife tool can be moved to the center of the unprocessed material to do the processing by being driven by the first power unit, and the front/back moving and the target processing can be achieved as well. When the spindle unit needs to be turned to straight direction to do the processing, the first power unit can force the lifting/lowering unit to step back and thus allows the spindle unit to turn to the straight direction and being positioned. Therefore, compared to the conventional method of manually releasing or tightening bolts, the automatic operation mode of the present invention is not only quick in operation, but also provides more precise and accurate way to adjust the spindle unit.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
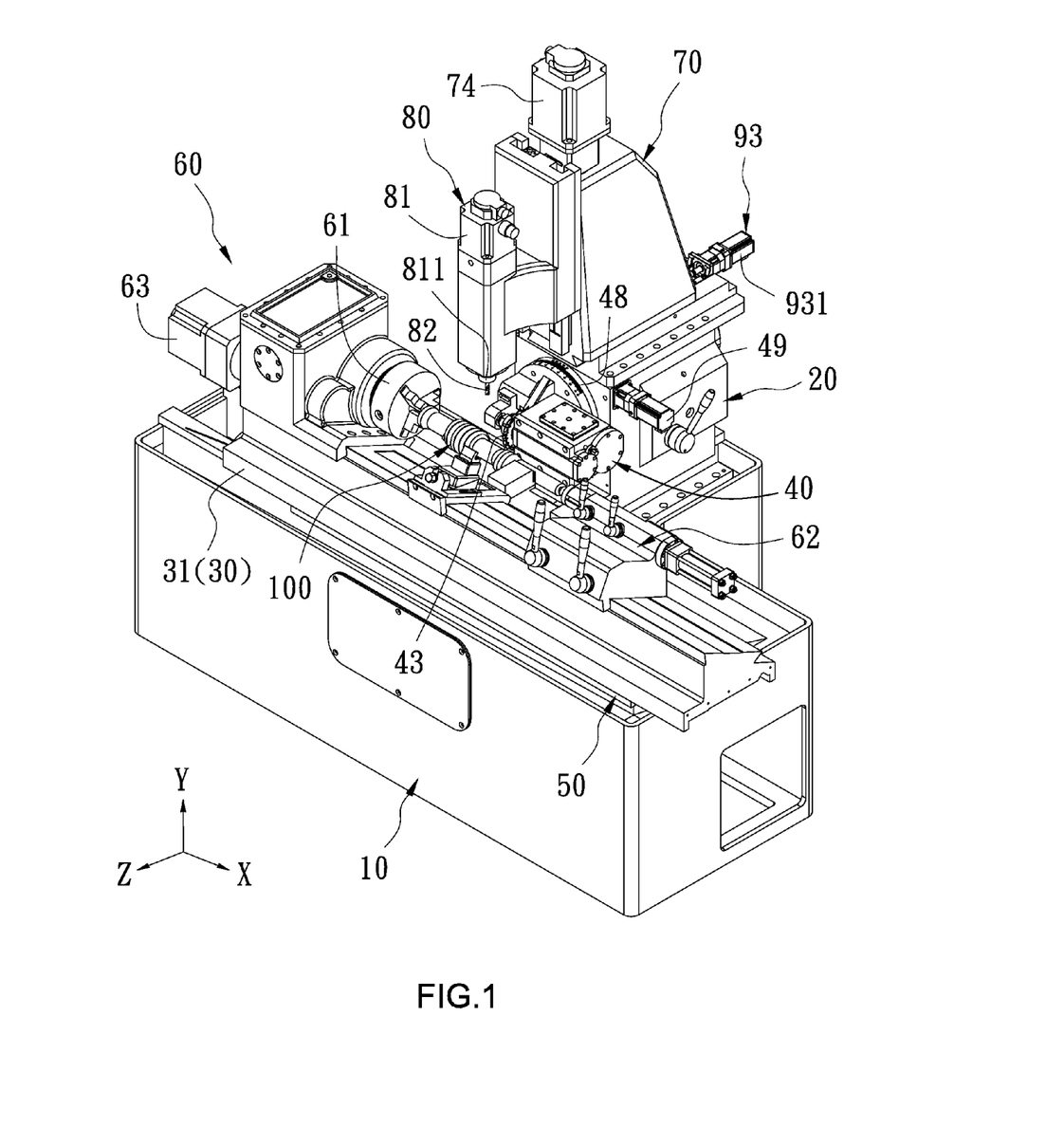
FIG. 1 is a perspective view of the screw rod forming machine according to the present invention.
Figure 2:
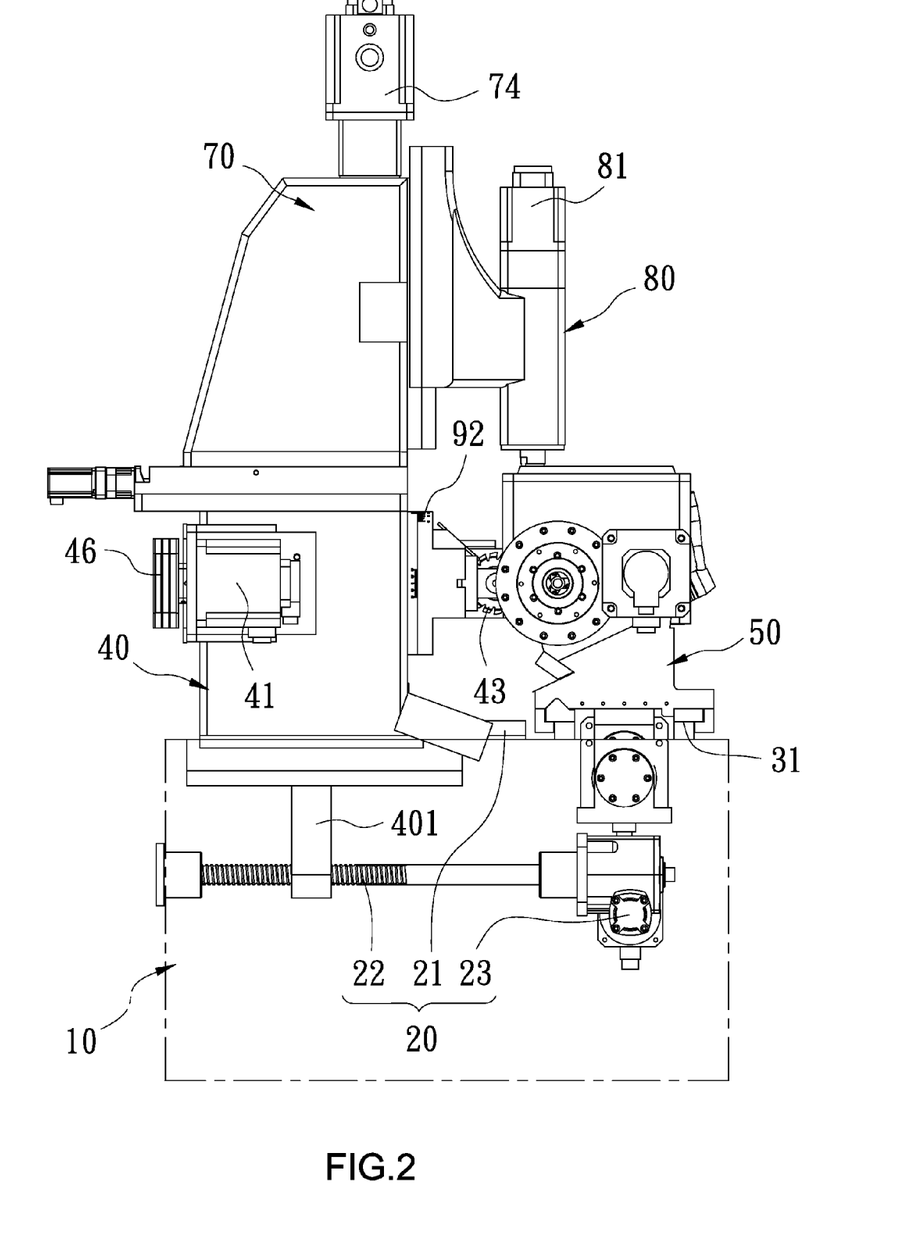
FIG. 2 is a side view of the screw rod forming machine according to the present invention, which shows the straight moving unit and the lateral moving unit without the base unit.

Please refer to FIGS. 1 and 2. The screw rod forming machine according the present invention includes a base unit 10, a straight moving unit 20, a lateral moving unit 30, a spindle unit 40, a platform 50, a clip unit 60, a lifting/lowering unit 70, a second processing unit 80, and a front/back moving unit 90.

Figure 7:
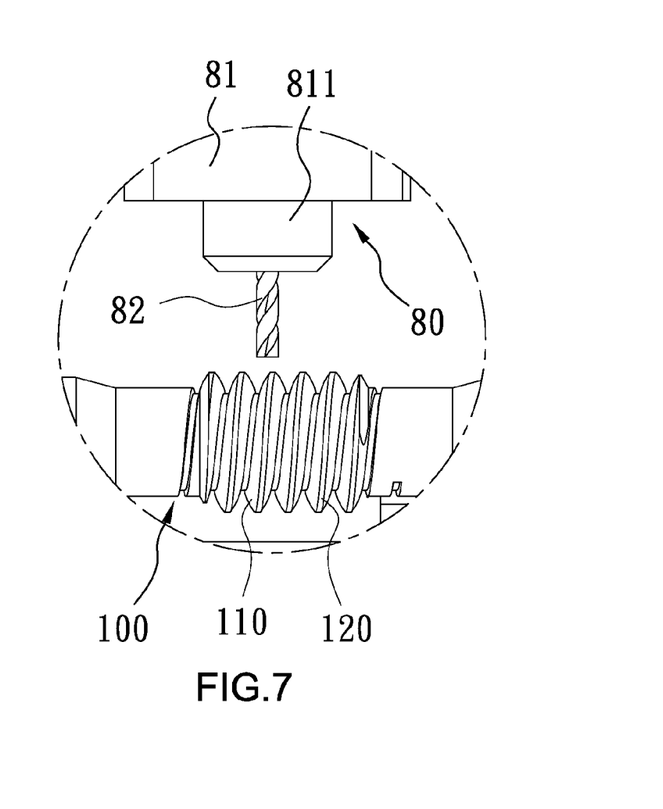
FIG. 7 is a magnified view after the screw threads and the lead angle on the unprocessed material are finished according to the present invention.

The screw rod forming machine according to the present invention is used to form a threaded portion 110 and a chamfering portion 120 on an unprocessed material 100. FIG. 1 shows processing the unprocessed material 100 to form the threaded portion 110. FIG. 7 shows after the threaded portion 110 is formed, the chamfering portion 120 is processed on the unprocessed material 100.

Figure 3:
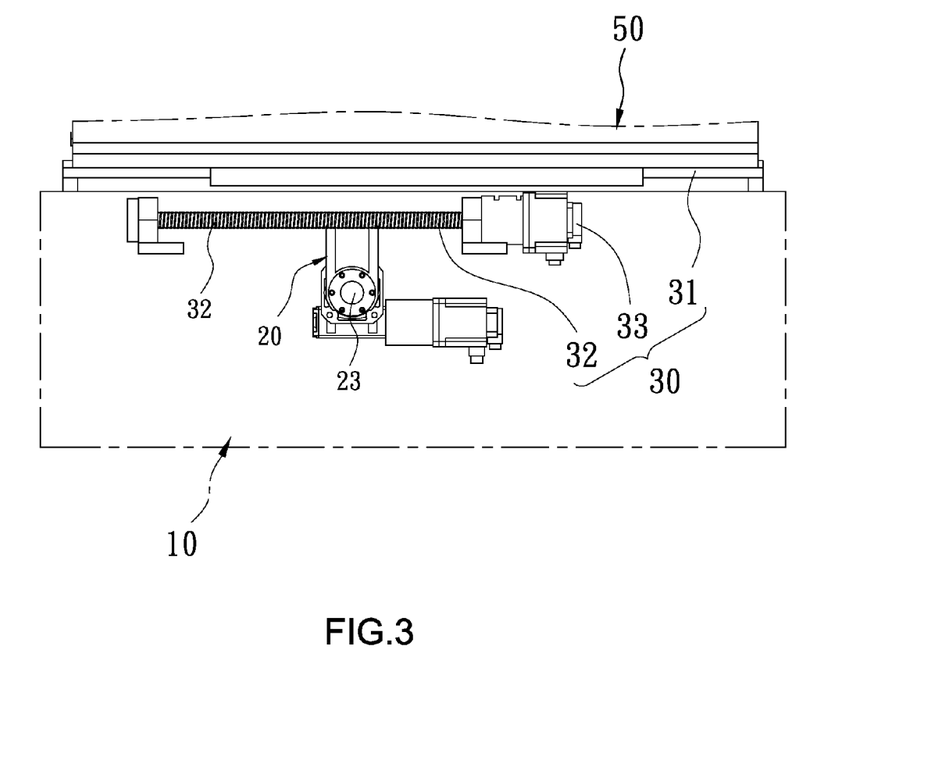
FIG. 3 is a back side view of the screw rod forming machine according to the present invention, which shows the straight moving unit and the lateral moving unit without the base unit.

Please refer to FIGS. 2 and 3. The straight moving unit 20 includes a straight slide track mechanism 21, a first screw rod 22, and a first power mechanism 23. A spindle unit 40 is slidably disposed on the base unit 10 in a front/back direction by the straight slide track mechanism.

The first screw rod 22 is disposed in the base unit 10 in a front/back direction. The spindle unit 40 is screwed to the first screw rod 22. As shown in FIG. 2, the spindle unit 40 is screwed to the first screw rod 22 by a screwing piece. The first power mechanism 23 provides rotation power to the first screw rod 22 to drive the spindle unit 40 move in a straight front/back direction.

Please refer to FIGS. 1-3. The lateral moving unit 30 includes a lateral slide track mechanism 31, a second screw rod 32, and a second power mechanism 33. The lateral slide track mechanism 31 is laterally disposed on the base unit 10, and the platform 50 is slidably disposed on the base unit 10 by the lateral slide track mechanism 31 in a left/right direction.

The second screw rod 32 is disposed in the base unit 10 in a left/right direction, and the platform 50 is screwed to the second screw rod 32. The second power mechanism 33 provides rotation power to the second screw rod 32 to drive the platform 50 to move in a left/right direction.

Please refer to FIGS. 1, 2, 4 and 5 The spindle 40 is slidably disposed on the base unit 10 (as shown in FIG. 2) by the straight moving unit 20. The spindle unit 40 mainly forms screw threads on the unprocessed material 100, and the spindle unit 40 includes a spindle motor 41 and a spindle knife seat 42 driven by the spindle motor 41. A thread forming tool 43 is disposed on the spindle knife seat 42, and the spindle unit 40 is driven by the straight moving unit 20 to move on the base unit 10 along a front/back direction to be close to or away from the platform 50. When the spindle motor 41 is activated, the power is transferred from a pulley mechanism 46 to a gear mechanism 47, and further being transferred to the spindle knife seat 42 via a bevel gear 44, thereby driving the thread forming tool 43 to form the threaded portion 110 on the unprocessed material 100 (shown in FIG. 1). Besides, when adjusting the speed ratio of the gear is needed, a gear lever 45 can be adjusted to change the speed ratio.

Figures 4, 5:
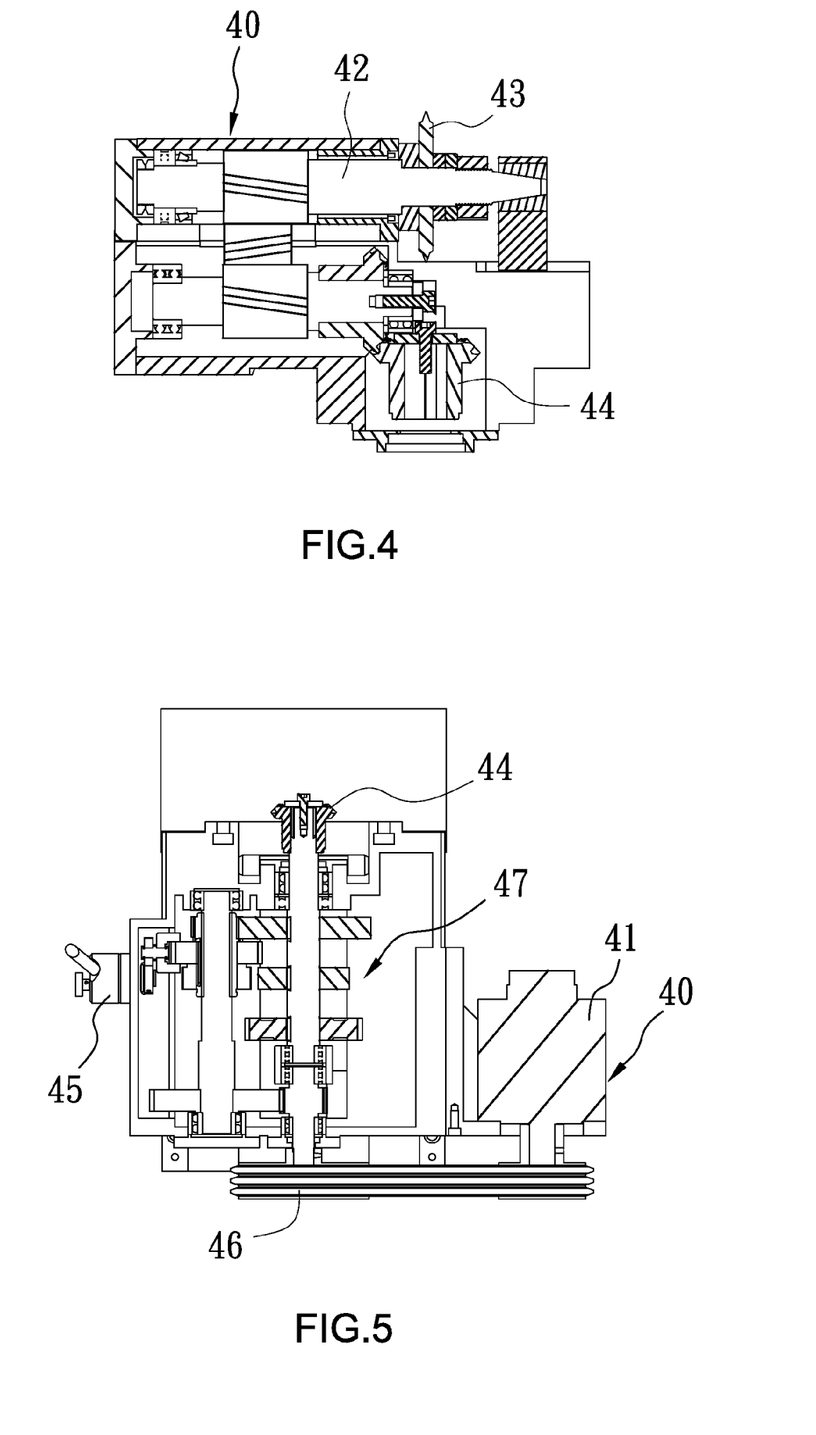
FIG. 4 is a cross sectional view of the screw rod forming machine according to the present invention.
FIG. 5 is an assembled cross sectional view of the gear mechanism and the spindle motor of the spindle unit of the screw rod forming machine according to the present invention.

Please refer to FIGS. 4 and 5. The pulley mechanism 47 and the gear mechanism 46 are provided between the spindle motor 41 and the spindle knife seat 42. The pulley mechanism 47 and the gear mechanism 46 are used to transfer power of the spindle motor 41 to the spindle knife seat 42 to drive the thread forming tool 43 to rotate.

The spindle unit 40 further includes an indexing plate 48 and a servo motor 49 provided on the straight moving unit 20. The servo motor 49 drives the indexing plate 48 and the spindle unit 40 to rotate, and the rotation angle of the spindle unit 40 is shown on the indexing plate 48 for adjusting the processing angle and position.

The platform 50 is slidably and laterally disposed on the base unit 10 by the lateral moving unit 30. The platform 50 is driven by the lateral moving unit 30 to move on the base unit 10 along a left/right direction.

Please refer to FIG. 1. The clip unit 60 is provided on the platform 50. The clip unit 60 includes a clamping head 61, a tailstock 62, and a clamping head rotation power device 63. The unprocessed material 100 is clamped between the clamping head 61 and the tailstock 62, and is driven by the clamping head rotation power device 63. Thus, the unprocessed material 100 is able to rotate.

Figure 8:
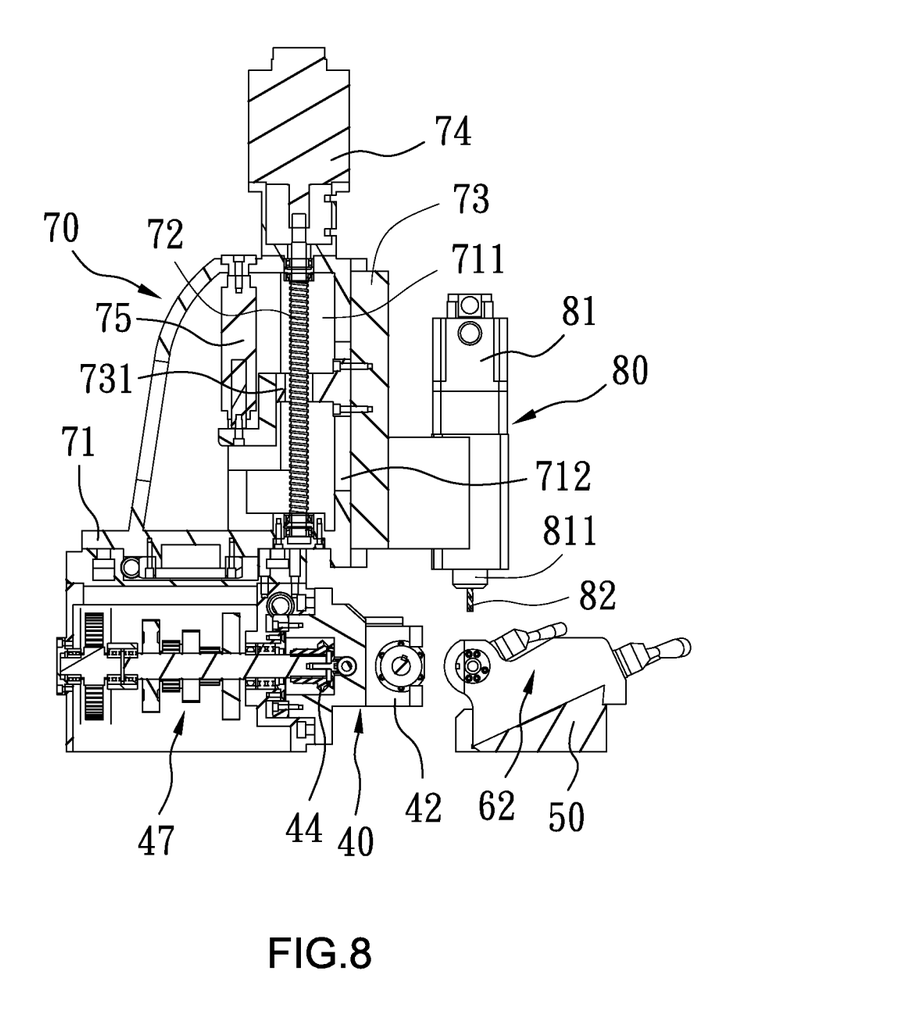
FIG. 8 is an assembling cross sectional view of the lifting/lowering unit and the spindle unit according to the present invention.

Please refer to FIG. 8. The lifting/lowering unit 70 includes a fastening seat 71, a lifting/lowering screw rod 72, a sliding base 73, and a second power unit 74. In the present embodiment, the lifting/lowering unit 70 is disposed on the spindle unit 40. The lifting/lowering screw rod 72 is disposed in the fastening seat 71. The sliding base 73 is able to slidably disposed on the front side of the fastening seat 71 in an up/down direction, and the sliding base 73 has a screwing piece 731 screwed to the lifting/lowering screw rod 72. The second processing unit 80 is disposed on the sliding base 73. The second power unit 74 drives the lifting/lowering screw rod 72 to rotate to further drive the sliding base 73 to move in an up/down direction. The second power unit 74 in the present embodiment is a motor, such as servo motor.

Please refer to FIG. 8. An accommodating space 711 is provided in the fastening seat 71 of the lifting/lowering unit 70, the accommodating space 711 has a long opening 712 opened in an up/down direction. The lifting/lowering screw rod 72 is disposed in the accommodating space 711. The screwing piece 731 of the sliding base 73 inserts into the accommodating space 711 via the long opening 712 to screw with the lifting/lowering screw rod 72. The lifting/lowering unit 70 further includes a cylinder 75 which moves with the sliding base 73. The cylinder 75 can buffer the landing force.

In the present embodiment, the second processing unit 80 includes a power unit 81 and a second processing knife tool 82 disposed on the lifting/lowering unit 70 in an upright position. The power unit 81 is disposed on the front side of the lifting/lowering unit 70. The power unit 81 has a mandrel 811. The second processing knife tool 82 is vertically disposed beneath the center of the mandrel 811 of the power unit 81. The second processing unit 80 is able to move up and down by the lifting/lowering unit 70 to be close to or away from the unprocessed material 100. The second processing knife tool 82 in the present embodiment is a files, which is clamped by the mandrel 811 and hung on the front top side of the spindle unit 40.

Figure 9:
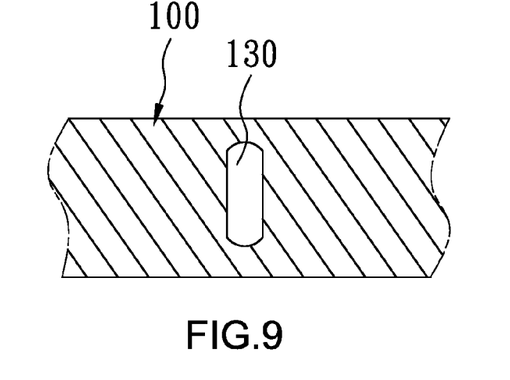
FIG. 9 is a cross sectional view that the unprocessed material formed with a straight key slot according to the present invention.

Besides, the second processing unit 80 is connected to the spindle unit 40 by the lifting/lowering unit 70. The second processing knife tool 82 of the second processing unit 80 is able to be controlled by the straight moving unit 20 to move on the base unit 10 in a front/back direction, thereby performing the processing at the front and back position of the unprocessed material 100 to form the key slot 130, as shown in FIG. 9.

Figure 10:
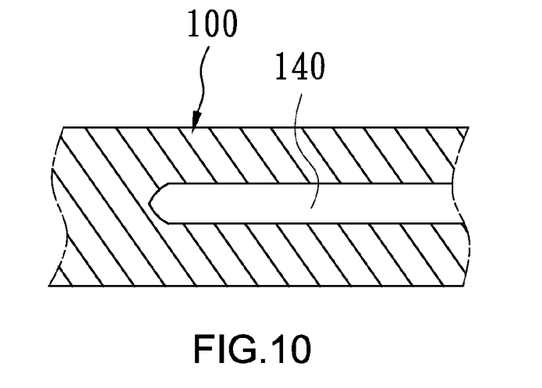
FIG. 10 is a cross sectional view that the unprocessed material is formed with a groove according to the present invention.
Figure 11:
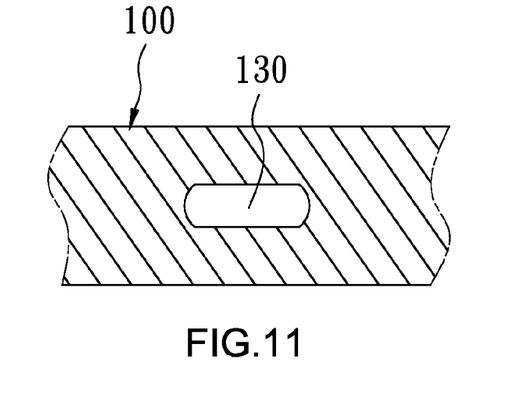
FIG. 11 is a cross sectional view that the unprocessed material is formed with a lateral key slot according to the present invention.
Figure 12:
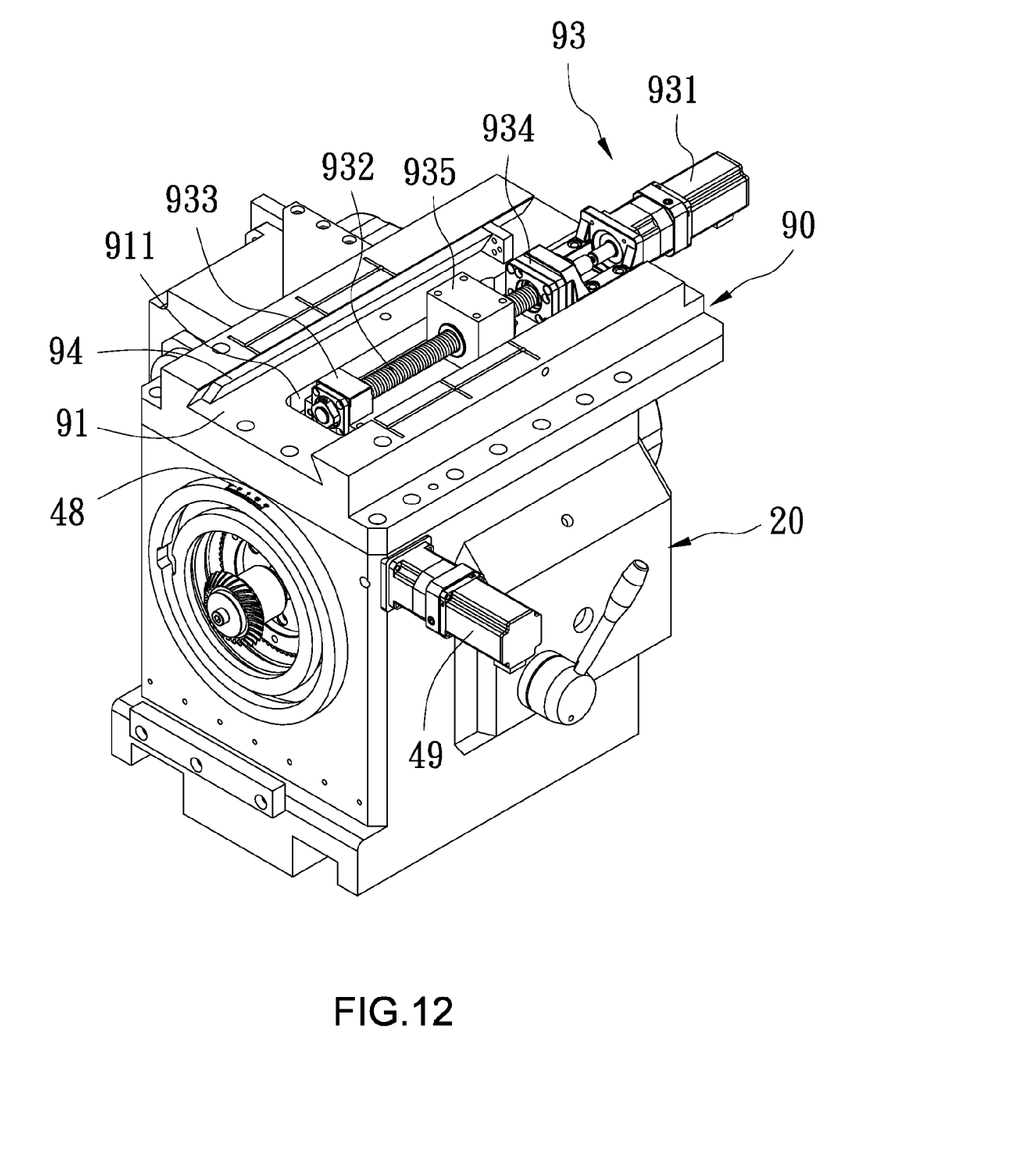
FIG. 12 is a stereogram showing the front/back moving unit being installed on the straight moving unit according to the present invention.
Figure 13:
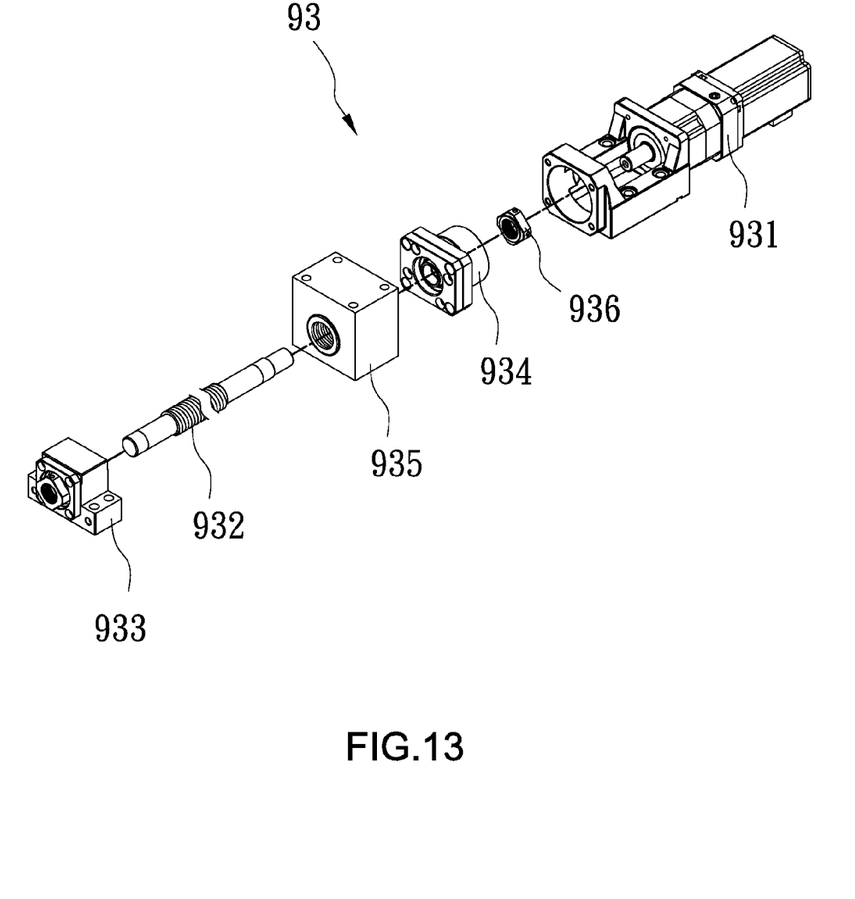
FIG. 13 is a perspective view of the front/back moving unit according to the present invention.
Figure 14:
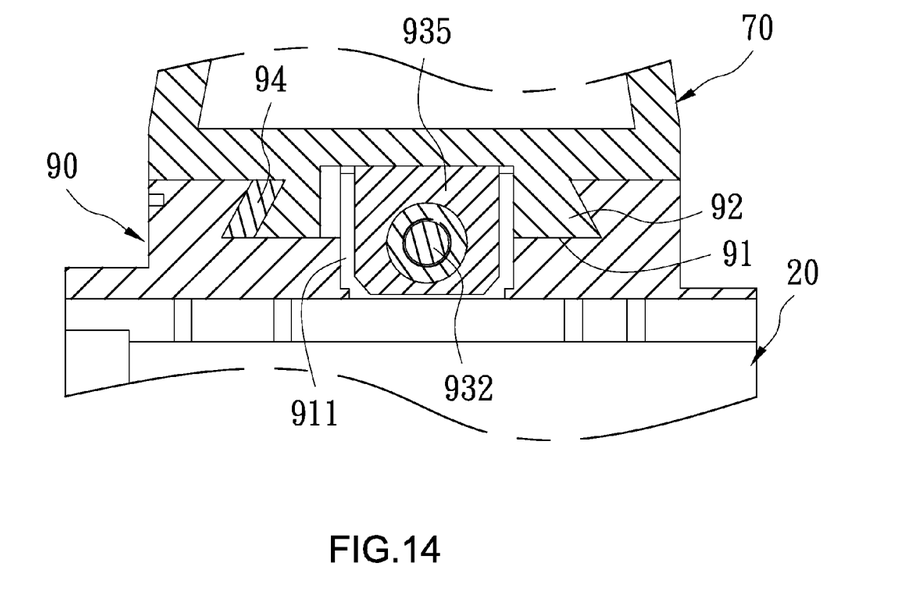
FIG. 14 is a longitudinal sectional view that the front/back moving unit is disposed between the straight moving unit and the lifting/lowering unit according to the present invention.
Figure 15:
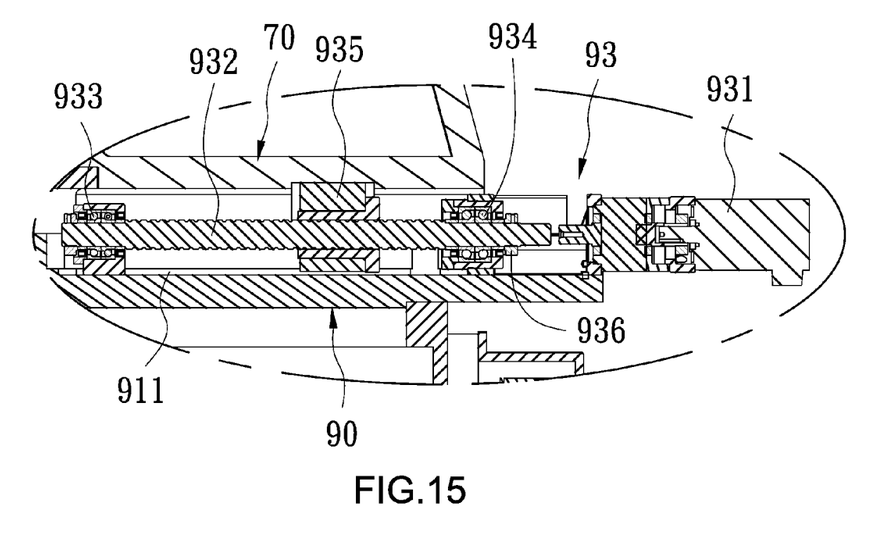
FIG. 15 is a lateral sectional view that the front/back moving unit is disposed between the straight moving unit and the lifting/lowering unit according to the present invention.

Similarly, the second processing unit 80 is disposed above the lateral moving unit 30. When the unprocessed material 100 is driven by the lateral moving unit 30 to move in a left/right direction, the unprocessed material 100 can move in a left/right direction relative to the second processing knife tool 82 which thereby performing straight processing to the unprocessed material 100 to form a groove 140, as shown in FIG. 10, or performing processing to the unprocessed material 100 to form a key slot 130 in a left/right direction, as shown in FIG. 10.

As shown in FIGS. 12-15 In the present invention, the front/back moving unit 90 is disposed between the straight moving unit 20 and the lifting/lowering unit 70. The front/back moving unit 90 includes a first sliding engagement part 91 disposed on the top of the straight moving unit 20, a second sliding engagement part 92 disposed on the bottom of the lifting/lowering unit 70, and a first power unit disposed on a notch 911 of the first sliding engagement part 91. The first sliding engagement part 91 and the second sliding engagement part 92 slidably connect to each other to do the straight movement. By driven by the first power unit 93, the lifting/lowering unit 70 can move along the first sliding engagement part 91 in a front/back direction. In the present embodiment, the first sliding engagement part 91 is a groove track, and the second sliding engagement part 92 is a sliding block. The first sliding engagement part 91 and the second sliding engagement part 92 are fitted to each other in a dovetail shape. The straight moving unit 90 further has a platen 94 fixed to the second sliding engagement part 92 for adjusting the tightness between the first and the second sliding engagement part 91, 92.

The first power unit has a motor 931, a screw rod 932 driven by a mandrel of the motor 931, two bearing seats 933,934 sleeved on both ends of the screw rod 932, a sliadable base 935 sleeved on the screw rod 932, and a fixation piece 936. In the present embodiment, the slidable base 935 has inner threads screwed with the screw rod 932. The motor 931 is a servo motor which has a function of electromagnetic brake. The bottom of the lifting/lowering unit 70 is fixed to the top of the slidable base 935. When the motor 931 drives the screw rod 932 to rotate, the slidable base 935 and the lifting/lowering unit 70 move along the screw rod 932 simultaneously, thereby allowing the lifting/lowering unit 70 to move toward the front/back direction on the straight moving unit 20. Therefore, when the size of the unprocessed material 100 becomes bigger, the first power unit 93 drives the lifting/lowering unit 70 to simultaneously move with the second processing unit 80. Thus, the second processing knife tool 82 of the second processing unit 80 can point to the center of the unprocessed material 100 after being fine tuning and calibrated. Meanwhile, by this arrangement, the second processing unit 80 can move in a front/back direction and do the processing in a specific position, which means the second processing unit 80 can not only do the processing at the center point, but also at the eccentric position.

Please again refer to FIG. 1. After the thread forming tool 43 of the spindle unit 40 forms the threaded portion 110 of the unprocessed material 100, the thread forming tool 43 will slide out of the processing place along X axis direction. And then, the second processing unit 80 moves downward by the lifting/lowering unit 70 to allow the second processing knife tool 82 to be close to the unprocessed material 100 (shown in FIG. 7), and forms a chamfering portion 120 to the threaded portion 110 of the unprocessed material 100, thereby get rid of the rough angle of the threaded portion 110 of the unprocessed material 100.

Figure 6:
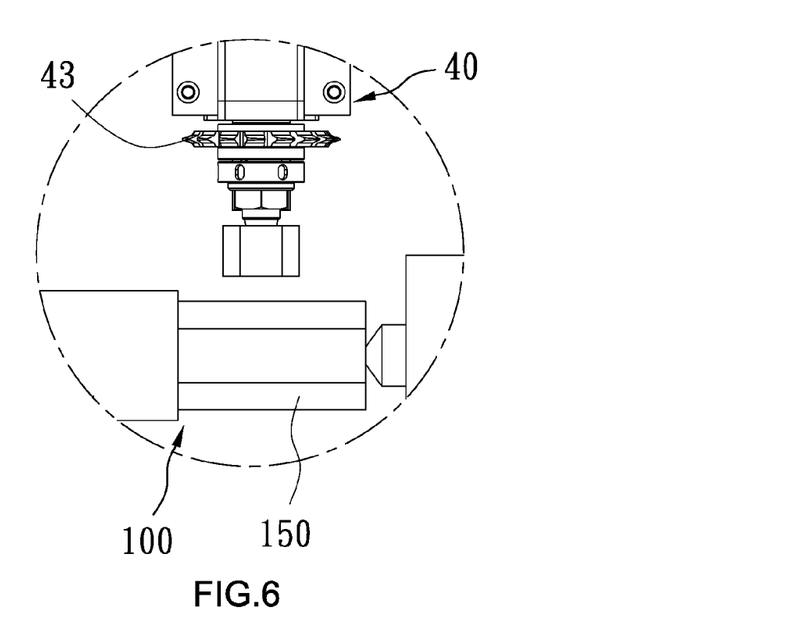
FIG. 6 is a magnified view of the finished bolt portion unprocessed material according to the present invention.
Figure 17:
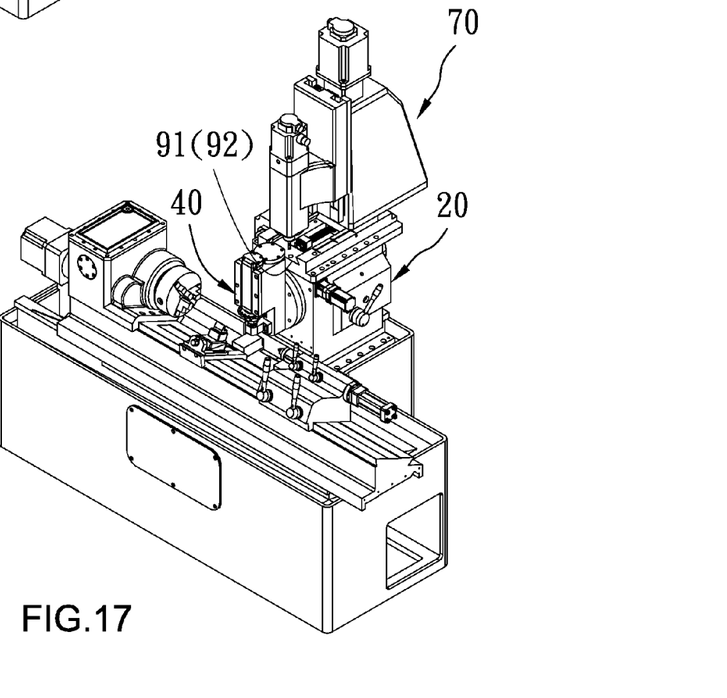
FIG. 17 is still another stereogram of the screw rod forming machine according to the present invention, which shows the spindle unit turns to an upright processing position.

Besides, when the spindle unit 40 turns to an upright position as shown in FIG. 17, the spindle unit 40 can also process the unprocessed material 100, such as do the processing to the bolt portion 150 of the end of the unprocessed material 100 (as shown in FIG. 6), like corner bolt or hex bolt, etc. FIG. 6 shows hex bolt.

Figure 16:
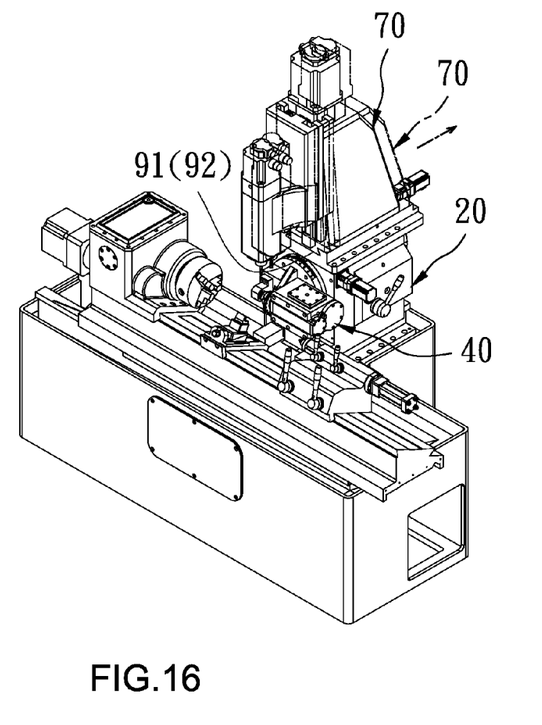
FIG. 16 is another stereogram of the screw rod forming machine according to the present invention, which shows using the front/back moving unit to move the lifting/lowering unit backward.

Therefore, the screw rod forming machine of the present invention can be computer automated to sequentially form the screw threads by the thread forming tool 43, trim the rough edge, form the key slot and groove by the second processing knife tool 82. The front/back moving unit 90 can adjust the lifting/lowering unit 70 to move in a front/back direction relative to the spindle unit 40. By this arrangement, when the size of the unprocessed material 100 becomes bigger, the first power unit 93 drives the lifting/lowering unit 70 to simultaneously move with the second processing unit 80. Thus, the second processing knife tool 82 of the second processing unit 80 can point to the center of the unprocessed material 100 after being fine tuning and calibrated, and the second processing unit 80 also can move in a front/back direction and do the processing in a specific position. As shown in FIGS. 16 and 17, when the spindle unit 40 needs to turn to an upright position to do the processing as shown in FIG. 17 (such as the processing of the

What is claimed is:
1. A screw rod forming machine, comprising:
   a base unit;
   a straight moving unit;
   a lateral moving unit;
   a platform slidably disposed on the base unit by the lateral moving unit and driven by the lateral moving unit to move toward right or left direction along the base unit;
   a spindle unit slidably disposed on the base by the straight moving unit; the spindle unit being used to form screw threads on a screw rod, and the spindle unit comprising a spindle motor and a spindle knife seat driven by the spindle motor; a thread forming tool being formed on the spindle knife seat; the spindle unit being driven by the straight moving unit to move toward front or back direction to be close to or away from the platform;
   a clip unit being disposed on the platform, and the clip unit comprising a clamping head, a tailstock, and a clamping head rotation power device; an unprocessed material being clamped between the clamping head and the tailstock, and the unprocessed material being driven by the clamping head rotation power device to move;
   a lifting/lowering unit being provided on the straight moving unit;
   a second processing unit comprising a power unit vertically disposed on the lifting/lowering unit, and a second processing knife tool driven by the power unit; the second processing unit being able to be close to or away from the unprocessed material by moving up and down via the lifting/lowering unit; and
   a front/back moving unit being disposed between the straight moving unit and the lifting/lowering unit; the front/back moving unit comprising a first sliding engagement part disposed on the straight moving unit, and a second sliding engagement part disposed on the lifting/lowering unit, and a first power unit; the first sliding engagement part and the second sliding engagement part slidably connecting to each other; the lifting/lowering unit being able to move toward front or back direction along the first sliding engagement part by being driven by the first power unit.

2. The screw rod forming machine according to claim 1, wherein the first sliding engagement part has a notch; the first power unit of the front/back moving unit is accommodated inside the notch of the first sliding engagement part; the front/back moving unit further has a motor, a screw rod driven by a mandrel of the motor, and two bearing seats sleeved on both ends of a screw rod and a slidable base sleeved on the screw rod; a bottom of the lifting/lowering unit is fixed to the slidable base; when the motor drives the screw rod to rotate, the slidable base and the lifting/lowering unit move along the screw rod simultaneously, thereby allowing the lifting/lowering unit to move toward the front/back direction on the straight moving unit and being relative thereto.

3. The screw rod forming machine according to claim 2, wherein the first sliding engagement part is a groove track, and the second sliding engagement part is a sliding block; the first sliding engagement part and the second sliding engagement part are fitted to each other in a dovetail shape.

4. The screw rod forming machine according to claim 2, wherein the second processing unit and the spindle unit move in a straight front/back direction by the front/back moving unit.

5. The screw rod forming machine according to claim 2, wherein the motor is a servo motor with electromagnetic brake.

6. The screw rod forming machine according to claim 1, wherein the second processing unit connects to the spindle unit by the lifting/lowering unit; the second processing knife tool of the second processing unit is controlled by the straight moving unit and moves toward front/back direction on the base unit.

7. The screw rod forming machine according to claim 1, wherein the second processing unit is disposed above the lateral moving unit; when the unprocessed material moves in a left/right direction by the lateral moving unit, the unprocessed material moves in a left/right direction corresponding to the second processing knife tool, thereby doing straight processing or lateral processing to the unprocessed material.

8. The screw rod forming machine according to claim 1, wherein the lifting/lowering unit comprising:
- a fastening seat disposed above the spindle unit;
- a lifting/lowering screw rod; disposed in the fastening seat;
- a sliding base slidably disposed on the front side of the fastening seat and being able to move in an up or down direction; the sliding base having a screwing piece screwed with lifting/lowering screw rod, and the second processing unit being disposed on the sliding base; and
- a second power unit driving the lifting/lowering screw rod to rotate so as to move the sliding base in an up/down direction.

9. The screw rod forming machine according to claim 1, wherein the straight moving unit comprising:
- a straight slide track mechanism, and the spindle unit being slidably disposed on the base unit by the straight slide track mechanism to move in a front/back direction;
- a first screw rod disposed in the base unit in a front/back direction, and the spindle unit being screwed to the first screw rod; and
- a first power mechanism providing rotation power to the first screw rod so as to drive the spindle unit to move straight in a front/back direction.

10. The screw rod forming machine according to claim 1, wherein the lateral moving unit comprising:
- a lateral slide track mechanism laterally disposed on the base unit; the platform slidably disposed on the base unit by the lateral slide track mechanism in a left/right direction;
- a second screw rod disposed in the base unit in a left/right direction, and the platform being screwed to the second screw rod; and
- a second power mechanism providing rotation power to the second screw rod so as to drive the platform to move straight in a left/right direction.

11. The screw rod forming machine according to claim 1, wherein the spindle unit further comprises an indexing plate and a servo motor disposed on the straight moving unit; the servo motor drives the indexing plate and the spindle unit to rotate.

12. The screw rod forming machine according to claim 1, wherein the straight moving unit further has a platen fixed to the second sliding engagement part for adjusting the tightness between the first and the second sliding engagement part.

13. The screw rod forming machine according to claim 1, wherein the first sliding engagement part is a groove track, and the second sliding engagement part is a sliding block; the first sliding engagement part and the second sliding engagement part are fitted to each other in a dovetail shape.

14. The screw rod forming machine according to claim 1, wherein the second processing unit and the spindle unit move in a straight front/back direction by the front/back moving unit.

* * * * *